May 19, 1953   L. LEE II   2,638,912
FLUID DISTRIBUTING APPARATUS
Original Filed Nov. 21, 1947
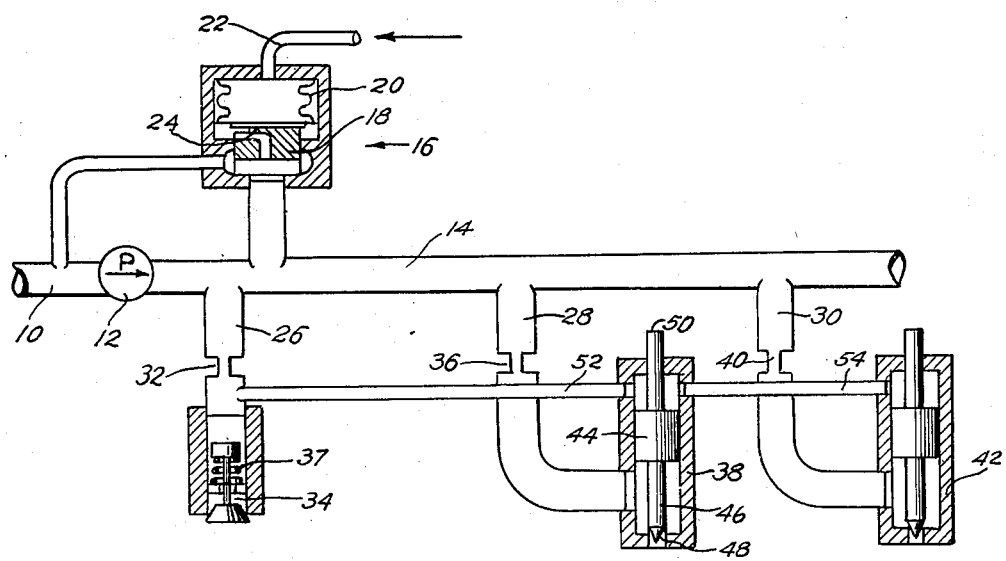
INVENTOR
Leighton Lee II.
BY
ATTORNEY

Patented May 19, 1953

2,638,912

UNITED STATES PATENT OFFICE 2,638,912

FLUID DISTRIBUTING APPARATUS

Leighton Lee II, Rocky Hill, Conn., assignor to Niles-Bement-Pond Company, West Hartford, Conn., a corporation of New Jersey Original application November 21, 1947, Serial No. 787,415, now Patent No. 2,601,849, dated July 1, 1952. Divided and this application September 21, 1949, Serial No. 117,001

8 Claims. (Cl. 137—118)

The present invention relates to apparatus for distributing equal quantities of fluid from a common source to a number of discharge points.

The present invention is an improvement on the structure shown and claimed in the copending application of Milton E. Chandler, Serial No. 782,757, filed October 29, 1947, which has common ownership with applicant's assignee. The present application is a division of my copending application, Serial No. 787,415, filed November 21, 1947, now Patent 2,601,849, dated July 1, 1952.

In systems of this type, wherein a main supply line delivers into several branch distributing lines, it is customary to provide each branch line with an individual flow control valve. Mechanism for simultaneously controlling a number of individual valves which may be widely separated tends to be complicated.

In some fluid distributing systems of the prior art, it has been proposed to place an individual pump in each distributing branch line, and to drive all the pumps from a common power source so that all operate at the same speed. Difficulties in such systems have been encountered because of variations in the adjustment and volumetric efficiency of the individual pumps.

Another type of prior art system employs a single variable delivery pump employing a number of individually controlled branch conduits. Where such a system is used, it is necessary to control the individual branch conduit valves concurrently with the pump delivery control to avoid building up excessive pressures at the discharge side of the pump.

An object of the present invention is to provide improved and simplified fluid distributing apparatus.

Another object is to provide a fluid distributing system, including a plurality of branch distributing conduits, in which the control valve in one conduit serves as a pilot for the control valves in the other conduits.

Other objects and advantages of my invention will become aparent from a consideration of the appended specification, claims and drawing, in which The figure illustrates, somewhat diagrammatically, a fluid distributing system embodying certain features of my invention.

Referring now to the drawing, the fluid comes from a tank (not shown) and flows through an inlet conduit 10, a pump 12, and a main discharge conduit 14. The pump discharge pressure is regulated by a relief valve mechanism generally shown at 16. This mechanism includes a piston valve 18 operated by a bellows 20. The interior of bellows 20 is supplied with a variable control fluid pressure through a conduit 22. The exterior of bellows 20 is exposed to the pump discharge pressure through a passage 24 extending through the valve 18. The valve mechanism 16 operates to maintain the discharge pressure of pump 12 at whatever value is required to balance the force due to the variable control fluid pressure acting on bellows 20.

The fluid is distributed from conduit 14 through three branch conduits 26, 28 and 30. Branch conduit 26 includes a metering orifice 32 and a discharge valve 34 biased to closed position by a spring 37. Discharge conduit 28 includes a metering orifice 36 and a control valve 38.

The branch conduit 30 includes a similar metering restriction 40 and a control valve 42. Control valve 42 is similar in all respects to control valve 38, and only the latter will be described in detail. The control valve 38 includes a piston 44 attached by a stem 46 to a discharge valve 48. The upper end of piston 44 is attached to a guide rod 50. The space below piston 44 is subject to the fuel pressure on the downstream side of metering restriction 36. The space above piston 44 is subject to the fuel pressure in a pilot line 52, which communicates with discharge conduit 26 on the downstream side of metering restriction 32 therein. This same pressure is communicated to a similar space on control valve 42 by means of a conduit 54.

If the pressure in conduit 52 is lower than the pressure under piston 44, then the piston 44 will rise, opening the valve 48 wider. This upward movement of valve 48 will continue until the pressures are balanced on the opposite side of piston 44. Therefore it may be seen that control valve 38 operates to maintain the pressure on the downstream side of restriction 36 equal to that on the downstream side of restriction 32. Since the areas and the pressures on the upstream sides of the two restrictions are the same, then the flow through both restrictions will be substantially the same. The system therefore operates to maintain equal flows through all the branch distributing conduits.

The terms and expressions as used herein are intended as terms of description and not of limitation, and I have no intention, in the use of such terms and expressions, of excluding any equivalent of the structures shown herein or parts thereof, but recognize that various modifications are possible within the scope of the invention claimed.

I hereby claim as my invention:

1. Apparatus for distributing fluid from a common source to a plurality of discharge points, comprising a plurality of branch conduits, each leading from said source to one of said points, a metering restriction in each of said conduits, a valve in each of said conduits downstream from its associated restriction, a spring biasing the valve in one of said conduits toward closed position, said spring biased valve being subject to the pressure of the fluid in its associated conduit acting directly thereon in an opening direction, said spring and valve being effective to maintain said pressure substantially constant, operating means for each of the valves in the other of said conduits including, for each valve, a pair of expansible chambers separated by a movable wall, a connection between said wall and its associated valve, a fluid conduit connecting one of said chambers to its associated branch conduit on the downstream side of the restriction therein, and a fluid conduit connecting the other of said chambers to said one conduit on the downstream side of the restriction therein, so that said other valves maintain the pressure drops across their associated restrictions equal to the pressure drop across the restriction in said one conduit.

2. Apparatus for distributing fluid from a common source to a plurality of discharge points, comprising a plurality of branch conduits, each leading from said source to one of said points, a metering restriction in each of said conduits, a valve in each of said conduits downstream from its associated restriction, means for operating one of said valves to maintain a substantially constant pressure on the downstream side of its associated restriction, means for operating each of the others of said valves to maintain the pressures on the downstream sides of their associated restrictions equal to said substantially constant pressure.

3. Apparatus for distributing fluid from a common source to a plurality of variable, terminal discharge orifices, comprising a main fluid supply conduit and a plurality of branch conduits, each branch conduit leading from said main conduit to one of said orifices and having a fixed metering restriction therein; means for maintaining in said main conduit a pressure which bears a fixed ratio to a variable control pressure; and means for equalizing the pressure in all of said branch conduits downstream from their respective restrictions, whereby the fluid discharge at each of said orifices is the same.

4. Fluid distributing apparatus according to claim 3, including a valve in each of said orifices for controlling the flow therethrough and subject to the pressure in its associated branch conduit downstream from the restriction therein.

5. Apparatus for distributing fluid from a common source to a plurality of terminal discharge orifices, comprising a main fluid supply conduit, a pilot branch conduit and a plurality of other branch conduits, each other branch conduit leading from said main conduit to one of said orifices and having a fixed metering restriction therein; means for maintaining in said main conduit a pressure which bears a fixed ratio to a variable control pressure; and means for equalizing the pressure in all of said other branch conduits downstream from their respective restrictions, including a valve in each of said orifices for controlling the flow therethrough and subject to the pressure in said pilot conduit, whereby the fluid discharge at each of said orifices is the same.

6. Apparatus for distributing fluid from a common source to a plurality of variable, terminal discharge orifices, comprising a main fluid supply conduit and a plurality of branch conduits, each branch conduit leading from said main conduit to one of said orifices and having a fixed metering restriction therein; means for maintaining in said main conduit a pressure which bears a fixed ratio to a variable control pressure, and means for equalizing the pressure in all of said branch conduits downstream from their respective restrictions, whereby the fluid discharge at each of said orifices is the same.

7. Fluid distributing apparatus according to claim 6, including a valve in each of said orifices for controlling the flow therethrough and subject to the pressure in its associated branch conduit downstream from the restriction therein.

8. Apparatus for distributing fluid from a common source to a plurality of terminal discharge orifices, comprising a main fluid supply conduit, a pilot branch conduit and a plurality of other branch conduits, each other branch conduit leading from said main conduit to one of said orifices and having a fixed metering restriction therein; means for maintaining in said main conduit a pressure which bears a fixed ratio to a variable control pressure, and means for equalizing the pressure in all of said other branch conduits downstream from their respective restrictions, including a valve in each of said orifices for controlling the flow therethrough and subject to the pressure in said pilot conduit, whereby the fluid discharge at each of said orifices is the same.

LEIGHTON LEE II.

References Cited in the file of this patent

UNITED STATES PATENTS

| Number | Name | Date |
|---|---|---|
| 991,641 | Plantinga | May 9, 1911 |
| 2,240,515 | Partington | May 6, 1941 |
| 2,310,984 | Mock et al. | Feb. 16, 1943 |
| 2,430,264 | Wiegand | Nov. 4, 1947 |

FOREIGN PATENTS

| Number | Country | Date |
|---|---|---|
| 577,132 | Great Britain | of 1946 |